United States Patent [19]

Crase

[11] 4,157,022

[45] Jun. 5, 1979

[54] PRESSURE COMPENSATING COUPLING FOR IN HOLE MOTORS

[75] Inventor: Gary M. Crase, Cypress, Calif.

[73] Assignee: Smith International, Inc., Newport Beach, Calif.

[21] Appl. No.: 838,649

[22] Filed: Oct. 3, 1977

[51] Int. Cl.² ............................................. F16D 3/84
[52] U.S. Cl. ................................... 64/32 R; 64/32 F; 64/17 R
[58] Field of Search .............. 64/32 R, 32 F, 23, 17 R

[56] References Cited

U.S. PATENT DOCUMENTS

| | | | |
|---|---|---|---|
| 2,914,932 | 12/1959 | Emrick | 64/32 R |
| 3,326,323 | 6/1967 | Delker | 64/17 R |
| 3,406,537 | 10/1968 | Falkner | 64/23 |
| 3,543,536 | 5/1969 | Rekow | 64/32 R |
| 3,805,553 | 4/1974 | Yehl | 64/32 R |
| 3,962,889 | 6/1976 | Stillwagon | 64/32 F |
| 4,055,338 | 10/1977 | Dyer | 64/23 |

Primary Examiner—Charles J. Myhre
Assistant Examiner—R. C. Turner
Attorney, Agent, or Firm—Subkow and Kriegel

[57] ABSTRACT

A connecting rod assembly has universal joints at the ends of a connecting rod of tubular construction, the universal joints being lubricated by grease contained in the tubular rod and retained in the universal joints by flexible boots disposed about the exterior of the universal joints, the tubular rod containing a pair of pistons between which fluid from exterior of the universal joints can enter the tubular rod and equalize the pressure in the universal joints with the external fluid pressure.

The connecting rod assembly is installed between the rotor of an in-hole fluid motor of the progressive cavity type and the drive shaft of a bearing assembly for a motor driven drill.

18 Claims, 5 Drawing Figures

PRESSURE COMPENSATING COUPLING FOR IN HOLE MOTORS

BACKGROUND OF THE INVENTION

In the use of progressing cavity motors of the fluid driven type for driving a rotary drill, utilizing drilling fluid to drive the motor rotor and to flush cuttings from the bore hole, severe problems of wear occur due to the erosive nature of the drilling fluid and the heat of friction, and in the case of wells, the geothermal conditions. Accordingly, efforts have been made to resolve such problems.

Reference is made to U.S. Pat. 4,029,368, granted June 14, 1977, to me and John E. Tschirky, for "Radial Bearings", which contains a general discussion of some of these problems and provides improved radial bearing means for such structures to handle the periodic transverse forces caused by conversion of the eccentric motion of the motor rotor to rotary motion of the drive shaft, which is generally accomplished by a connecting rod assembly comprising a rod having universal joints at its ends connected with the motor rotor and with the drill drive shaft.

Typically, the universal joints are lubricated by a quantity of grease contained in the joints by a flexible cover or boot which is strapped about the universal joint and enables the relative motion to occur. When such boots are destroyed by external pressure extruding the boot into the voids between the working parts of the universal joint, or expansion of the boots caused by gassing or expansion of the grease due to the heat generated by the coupling, the universal joint is rapidly destroyed by the erosive effect of the fluid driving the motor.

Efforts have heretofore been directed toward alleviating the problem of destruction of the boot around universal joints of in-hole motor-drill connecting rods by providing means which are supposed to equalize the pressure of the lubricant inside the universal joints with the pressure of fluid in the housing.

SUMMARY OF THE INVENTION

The present invention provides an improved pressure compensating connector rod assembly having universal joints containing a lubricant enclosed in a boot, whereby the longevity of the boot and the protection of the universal joints from external fluid are enhanced, even under conditions of high temperature. The term universal joint is meant to include those couplings normally understood in the state of the art as being universal joints and other torque transmitting devices such as described in U.S. Pat. No. 3,269,069.

More particularly, the invention provides a pressure compensating connector rod assembly wherein pressure equalizing pistons in a tubular rod are exposed to external fluid pressure on one side and to the same external pressure on the other side by the universal joint lubricant through the pressure transfer characteristics of the boots, whereby thermal expansion of the lubricant tending to increase the lubricant pressure causes the pistons to displace external fluid from the tubular connecting rod to bring about pressure equalization, without expansion of the boots, thereby enhancing the longevity of the boots and the universal joints.

An object of the invention is to provide a pressure compensating connector rod assembly for an in-hole motor and drill or other down hole unit, wherein the connector rod assembly is better able to stand the effects of heat of friction and environmental pressure in order to enable continuous operation of the drilling operations without shutdown due to universal joint failure.

More particularly, the connecting rod assembly has an upper universal joint connected to the lower end of the rotor of a fluid driven motor of the helicoidal type, wherein the rotor revolves in an eccentric manner, and a lower universal joint connected to the upper end of a rotary drive shaft of a bearing assembly for the drill or other rotary device, the connecting rod assembly being in a section of the housing extending between the motor and the bearing assembly, through which motor drive fluid passes and flows into the drive shaft, which is tubular, at a rate and pressure determined by the drill or other rotary unit. In the case of a drill for well bores, the pressure is a function of pumping sufficient drilling fluid through the bit nozzles or orifices to flush cuttings from the well bore and cool the bit. This pressure is applied to the boots which contain a lubricant, such as grease, in the universal joints, and through the lubricant to pistons in the tubular connecting rod which are exposed, in a space between the pistons to the same external pressure. The pistons are free to move towards one another to maintain the pressure balance as the lubricant expands, during operation of the device.

Thus, the boots are not subjected to external pressure which will cause compression of the boots with resultant damage or destruction by extrusion between the working parts of the universal joint.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense. Referring to the drawings:

FIG. 1 is a view diagrammatically illustrating an inhole motor and drill assembly partly in elevation and partly in section, in operative position in a well bore and including a pressure compensating connecting rod in accordance with the invention;

FIGS. 2a and 2b, together, constitute an enlarged longitudinal section, as taken on the line 2—2 of FIG. 1, FIG. 2b being a downward continuation of FIG. 2a;

FIG. 3 is a further enlarged longitudinal section as taken on the line 3—3 of FIG. 2a, showing one of the equalizing pistons in condition for filling the universal joint with the lubricant; and FIG. 4 is a further enlarged transverse section as taken on the line 4—4 of FIG. 2b.

DESCRIPTION OF THE PREFERRED EMBODIMENT

Figure 1:
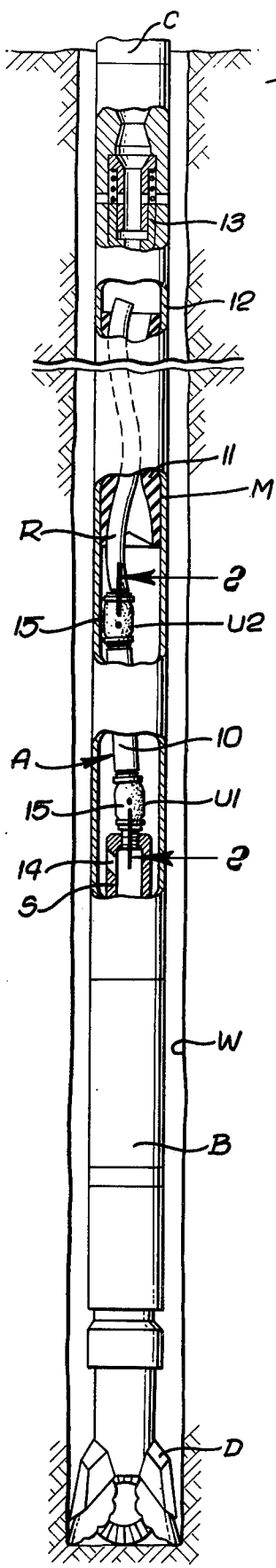

Referring first to FIG. 1, an in-hole motor and drill assembly is illustrated as being mounted at the lower end of a string of drill collars C which are connected, in the usual drilling operation, to a string of drill pipe extending to the surface of the earth and adapted to be rotated at a desired speed by a rotary table, whereby to rotate the assembly, as a well bore W is being drilled through the earth formation. At the lower end of the assembly is a conventional drill bit D rotatably supported by a bearing assembly B, which may be as more specifically illustrated and described in the above-identified U.S. Pat. No. 4,029,368. The bearing assembly includes a rotary drive shaft S of tubular form connected at its upper end to a connecting rod assembly A having a lower universal joint U1, an intermediate connecting rod 10 and an upper universal joint U2 connected to the lower end of the rotor R of a fluid driven motor assembly M of the progressing cavity type having a stator 11 in which the rotor R is rotatably mounted and driven by drilling fluid passing downwardly through the drill pipe from the top of the well bore, entering the motor housing 12 through a conventional bypass valve assembly 13, the drilling fluid discharging from the lower end of the motor into the downwardly extending housing, and entering the tubular drive shaft S through one or more ports 14 therein, the drilling fluid exiting through the drill bit D and then returning to the top of the well bore through the annular space defined between the tubular housing structure and the wall of the well bore. As thus far described, the structure is substantially conventional, and it will be noted that due to the helicoidal nature of the motor assembly, the lower end of the motor rotor R revolves in an eccentric path, while the drive shaft S, being supported in the bearing assembly B by a suitable radial and thrust bearings revolves substantially concentrically within the tubular body structure. The universal joints U1 and U2 enable the conversion of the eccentric motion of the rotor R to pure rotary motion at the drive shaft S, as is customary. Since the drilling fluid circulated through the motor and through the bearing assembly is quite erosive, it is well known that the universal joints U1 and U2 can be lubricated by enclosing within boots 15, a quantity of lubricant. However, as the drilling progresses and heat is generated due to friction, and since environmental effects may also substantially elevate the temperature in which the apparatus is operating, it has been determined that expansion of the lubricant contained in the universal joints by the boots 15 can cause expansion of the boots, and ultimate destruction thereof, particularly in the case of the boot of the upper universal joint U2 which may be forcefully caused to engage with the inner wall of the tubular housing structure and be virtually torn from the universal joint. When the boot or boots 15 become destroyed, the erosive drilling fluid finding access to the moving parts of the universal joints can cause very rapid deterioration thereof, possibly resulting in the need for removing the drilling pipe string from the well bore to replace the destroyed universal joints, prior to the time that any other change of the structure is necessary, such as the replacement of the drill D or repair or replacement of any of the bearing parts or the motor parts. Such destruction of a universal joint, therefore, can be very costly and time consuming in a drilling operation. In accordance with the present invention the universal joints of the connecting rod assembly A and the associated parts are so constructed that the pressure of the lubricant within the boots is equalized with the pressure of drilling fluid externally of the boots, so that the boots are not caused to expand or be deformed inwardly.

Figure 2A:
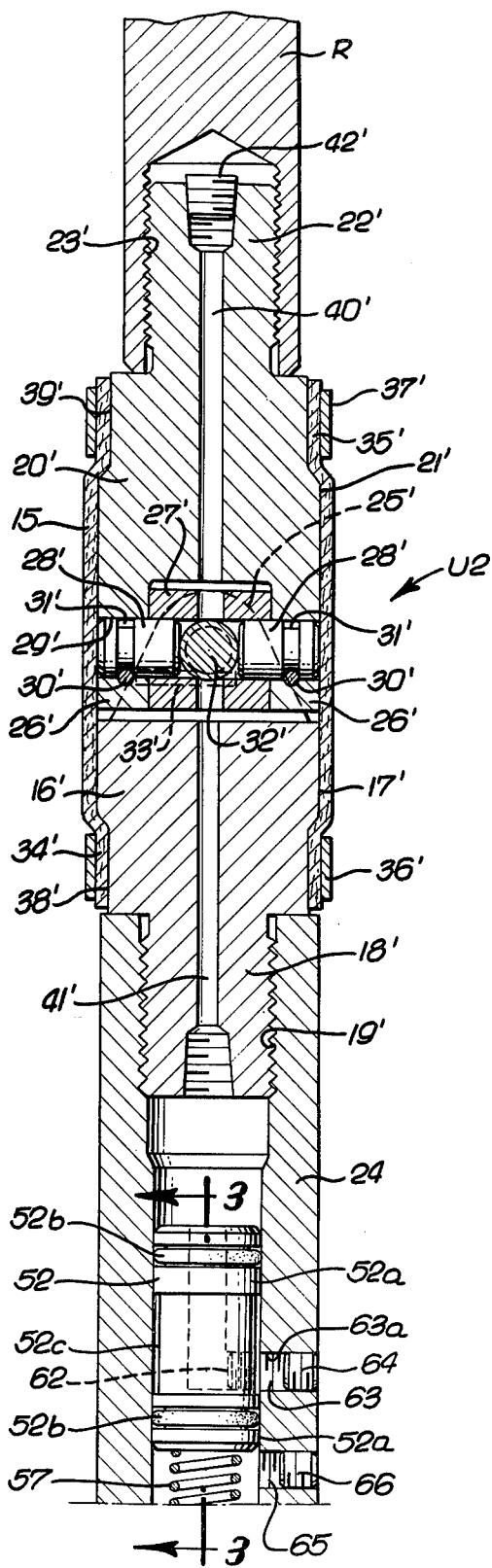
Figure 2B:
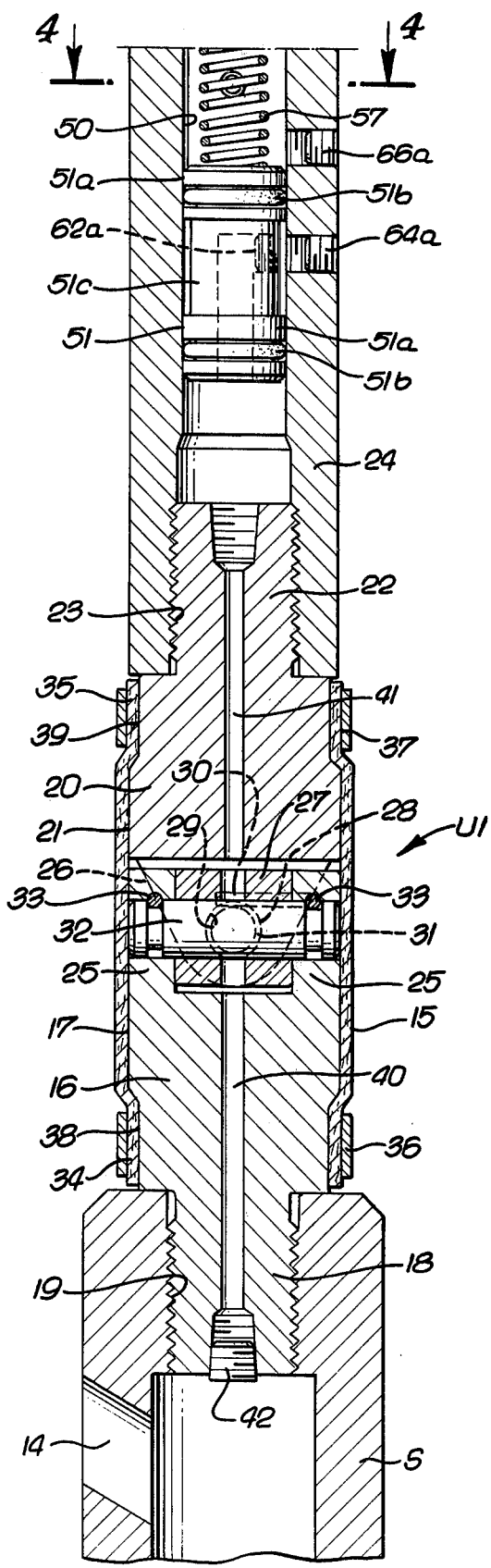

Referring to FIG. 2b, it will be seen that the universal joint assembly U1 comprises a lower connector end 16 providing a generally cylindrical body 17 having at its lower end a reduced threaded neck 18 which is threadedly engaged in a threaded bore 19 at the upper end of the tubular drive shaft S. Correspondingly, the universal joint U1 includes a connector end 20 having a generally cylindrical body section 21 provided with an upwardly projecting threaded neck 22 threadedly engaged in a threaded bore 23 at the lower end of a tubular connecting rod body 24. The universal joint body 16, at its upper end, has a pair of laterally spaced upwardly projecting ears or lugs 25 forming a yoke-like structure complemental with a pair of downwardly projecting ears or lugs 26, only one of which is shown, on the universal joint body 20. A drive block 27 is disposed between the ears 25 and 26 and receives a pair of short drive pins 28 which project inwardly from the respective ears 26 into a transverse bore 29 provided in the drive block 27. The pins 28 are retained in place by suitable means such as roll pins 30 which extend inwardly in the ears and engage in a peripheral groove 31 provided in the respective pins 28. A long drive pin 32 extends through the drive block 27 between the inner ends of the short drive pins 28 and is engaged with the ears 25 of the universal joint body section 16, being held in place by one or more roll pins 33. Thus, the respective body sections 16 and 20 are enabled to transmit rotation from the connection rod 24 to the drive shaft S, with the connecting rod out of alignment with the drive shaft.

The boot 15 is disposed about the cylindrical body sections 17 and 21 of the universal joint and has a lower end portion 34 and an upper end portion 35 clamped by lower and upper clamping bands 36 and 37 against reduced diameter cylindrical sections 38 on the body 16 and 39 on the body 20, whereby to confine a lubricant within the pivotally interconnected drive ears or lugs, drive block and pins of the universal joint.

Referring to FIG. 2a, it will be seen that the universal joint assembly U2 comprises a lower connector end 16' providing a generally cylindrical body 17' having at its lower end a reduced threaded neck 18' which is threadedly engaged in a threaded bore 1940 at the upper end of the connecting rod body 24. Correspondingly, the universal joint U2 includes a connector end 20' having a generally cylindrical body section 21' provided with an upwardly projecting threaded neck 22' threadedly engaged in a threaded bore 23' at the lower end of the motor rotor R. The universal joint body 16', at its upper end has a pair of laterally spaced upwardly projecting ears or lugs 25' forming a yoke-like structure complemental with a pair of downwardly projecting ears or lugs 26' on the universal joint body 20'. A drive block 27' is disposed between the ears 25' and 26' and receives a pair of short drive pins 28' which project inwardly from the respective ears 26' into a transverse bore provided in the drive block 27'. The pins 28' are retained in place by suitable means such as roll pins 30' which extend outwardly in the ears and engage in a peripheral groove 31' provided in the respective pins 28'. A long drive pin 32' extends through the drive block 27' between the inner ends of the short drive pins 28' and is engaged with the ears 25' of the universal joint body secttion 20', being held in place by one or more roll pins 33'. Thus, the respective body sections 16' and 20' are enabled to transmit the eccentric motion from the rotor R to the connecting rod 24 with the connecting rod out of alignment with the drive shaft.

The boot 15 of the joint U2 is disposed about the cylindrical body sections 17' and 21' of the universal joint and has a lower end portion 34' and an upper end portion 35' clamped by lower and upper clamping bands 36' and 37' against reduced diameter cylindrical sections 38' on the body 16' and 39' on the body 20', whereby to confine a lubricant within the pivotally interconnected drive ears or lugs, drive block and pins of the universal joint.

The details of the universal joints, per se, are not germane to the present invention, and the structure illustrated is only one form of universal drive. The significant factor insofar as the present invention is concerned is that the boots 15 can confine a lubricant within the working regions of the universal joints, such lubricant being supplied thereto, as will be later described, through an elongated passage 40 and 40' in the respective lower and upper universal joint body sections 16 and 20'. Since the universal joint bodies are of similar construction, it is apparent that a similar passage 41 and 41' exist in the respective lower and upper body sections 20 and 16', but the passages 40 and 40' are closed at their lower and upper ends by suitable pipe plugs 42 and 42'.

The connecting rod body 24, as previously indicated is of tubular construction and has therein an elongated cylindrical wall 50 defining and equalizing chamber containing a lower equalizing piston member 51 and an upper equalizing piston member 52. The piston 51 has a pair of axially spaced piston heads 51a receiving a suitable side ring or piston ring seal 51b slidably and sealingly engaged with the cylindrical wall 50 of the body. Between the heads 51a, the piston 51 has a reduced diameter body section 51c which serves a purpose to be later described.

Correspondingly, the upper equalizing piston 52 has axially spaced heads 52a carrying the suitable side ring or piston ring seal 52b slidably and sealingly engaged within the cylindrical bore 50 of the connecting rod body. Between the piston heads 52a is a reduced diameter body section 52c which also serves a purpose which will be later described.

Figure 4:
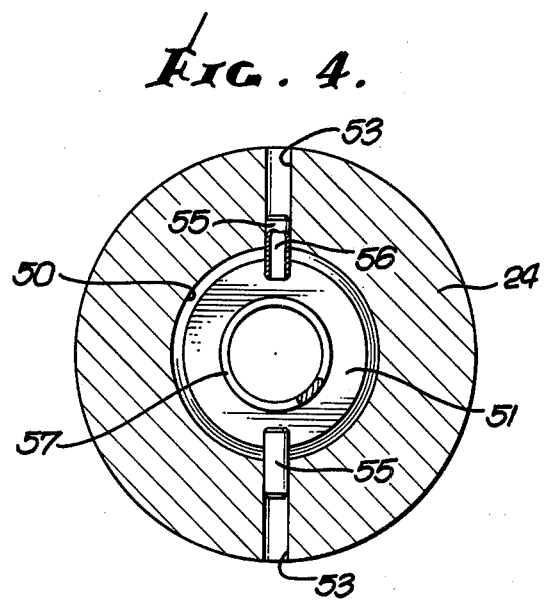

Midway of the length of the connecting rod body 24, as seen in FIG. 4, the body has one or more radial bores 53 communicating between the interior of the connecting rod body and the exterior thereof. Suitably mounted in the bores 53 are inwardly projecting members 55 which extend into the chamber between the respective pistons 51 and 52, providing a stop which prevents the respective pistons from moving beyond the center of the equalizing chamber.

The members 55 in the illustrative form are roll pins which provide a central passage 56 which establishes fluid communication between the exterior of the connecting rod body and the interior of the equalizing piston chamber between the pistons. Also disposed between the pistons 51 and 52 is a coiled compression spring 57.

Figure 3:
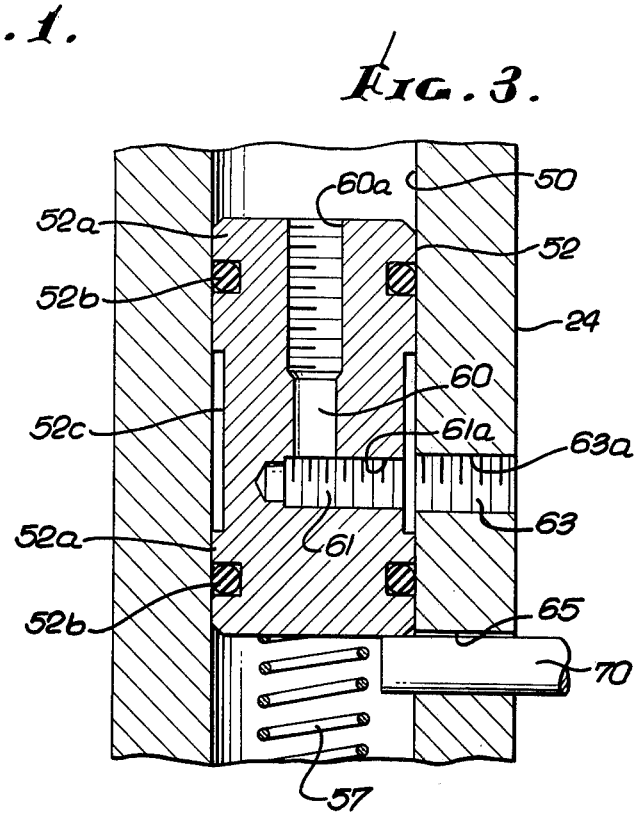

Referring to FIG. 3, the piston 52 is shown as having an axially extended passage 60 therein which communicates with a lateral port or passage 61 opening into the annular space between the piston heads 52a. The passage 60 has an upper internally threaded end section 60a, which can be engaged by a tool for inserting the piston into the cylinder bore. The lateral port 61 is internally threaded at 61a to receive a closure plug 62, as seen in FIG. 2a, which, following the filling procedure to be described below is threaded into the threaded bore 61a. At axially spaced locations, the body 24 has an upper lateral port or bore 63 internally threaded at 63a to receive a pipe plug 64 and a lower internally threaded lateral bore 65 adapted to receive a pipe plug 66. These pipe plugs 64 and 66 are shown installed in FIG. 2a following the filling procedure.

The filling procedure, whereby the connecting rod body 24 and the respective universal joint structures are filled with a lubricant, such as grease, is the same for both universal joints, and, accordingly, it will be noted in FIG. 2b that the connecting rod body 24 has plugs 64a and 66a in axially spaced relation corresponding to the plugs 64 and 66 shown in FIG. 2a. Likewise, the piston 51 has its lateral port closed by the plug 62a.

The procedure for filling the universal joint U2 with a lubricant and supplying such lubricant to the equalizing piston chamber above the piston 52 is as follows: The end closure plug 42' of the upper universal joint body section is removed. The piston 52 is located in the cylinder 50 with its lateral port 61 aligned with the lateral opening 63 in the body. Inward movement of the piston is limited by a suitable tool or bar 70 inserted through the lateral bore 65 to provide a stop engagable by the piston 52. With the connecting rod assembly in a vertical position, and with the passage 41' lowermost, the lubricant can be supplied through the passage 63a by connection with a suitable source (not shown) and will flow through passages 61, 60, into bore 50, through 41' and the universal assembly exiting through bore 40'. Thus, the lubricant will displace most of the air in the system. Pipe plug 42' is installed and the lubricant source is removed and a pipe plug 64 is installed. The bar 70 is also removed and pipe plug 66 is installed. The procedure is repeated on universal joint U1.

Thereafter, when the connecting rod assembly is installed in the apparatus of FIG. 1 between the motor rotor R and the drive shaft S, and the assembly is lowered into the well bore and utilized for the purpose of drilling, the internal lubricant within the connecting rod assembly will be pressurized to equilibrium with the pressure of fluid in the housing externally of the connecting rod assembly. The pistons 51 and 52 being of equal area at opposite ends thereof, are pressure balanced in the body. During the use of the apparatus, as the heat of friction and the effects of geothermal conditions raise the temperature of the lubricant within the connecting rod assembly, causing expansion thereof, the tendancy for the pressure to increase, which might otherwise cause expansion of the boots 15, is progressively equalized by movement of the pistons 51 and 52 towards one another into an equalized pressure condition, so that the pressure internally of the boots remains the same as the pressure externally of the assembly.

I claim:

1. A pressure compensating connecting rod assembly comprising: a tubular connecting rod body; universal joints at the ends of said body; boot means enclosing said universal joints for containing a lubricant in said body and said universal joints; and equalizing means in pressure transfer relation with said boot means internally of said boot means and with the exterior of said body for equalizing the pressure acting on said boot means while enabling thermal expansion of the lubricant.

2. A pressure compensating connecting rod assembly as defined in claim 1; said universal joints and said equalizing means having passage means for permitting the filling of said universal joints and said equalizing means with a lubricant and purging air therefrom.

3. A pressure compensating connecting rod assembly comprising: a tubular connecting rod body; universal joints at the ends of said body; boot means enclosing said universal joints for containing a lubricant in said body and said universal joints; and equalizing means in pressure transfer relation with said boot means internally of said boot means and with the exterior of said body for equalizing the pressure acting on said boot means; said equalizing means comprising an elongated cylinder in said body communicating with said universal joints, a pair of pistons reciprocable in said cylinder in sealing engagement therewith, and a port extending between the exterior of said body and said cylinder between said pistons.

4. A pressure compensating connecting rod assembly as defined in claim 3, said universal joints, said pistons and said body having passage means for permitting the filling of said universal joints and said cylinder between said universal joints and said pistons with a lubricant, with said pistons spaced apart at opposite sides of said port.

5. A pressure compensating connecting rod assembly as defined in claim 3, and including means permitting the filling of said universal joints and said cylinder between said universal joints with a lubricant, with said pistons sapced apart at opposite sides of said port.

6. A pressure compensating connecting rod assembly as defined in claim 3, said universal joints, said pistons and said body having passage means for permitting the filling of said universal joints and said cylinder between said universal joints and said pistons with a lubricant, with said pistons spaced apart at opposite sides of said port, and including a spring between said pistons in said cylinder.

7. A pressure compensating connecting rod assembly as defined in claim 3, and including means permitting the filling of said universal joints and said cylinder between said universal joints with a lubricant, with said pistons spaced apart at opposite sides of said port, and further including a spring between said pistons.

8. A pressure compensating connecting rod assembly as defined in claim 3, said body having a member extending into said cylinder between said pistons and having said port therethrough.

9. A pressure compensating connecting rod assembly as defined in claim 3, said universal joints, said pistons and said body having passage means for permitting the filling of said universal joints and said cylinder between said universal joints and said pistons with a lubricant, with said pistons spaced apart at opposite sides of said port, said body having side openings in axially spaced relation for receiving removable stops to hold said pistons axially spaced during said filling, and plugs closing said openings.

10. A pressure compensating connecting rod assembly as defined in claim 3, said universal joints having outer ends having means connectible to a drive member and a driven member and inner ends connected with said body at its ends, said ends of said universal joints having passages therethrough for the flow of lubricant from said outer ends through said inner ends into said cylinder.

11. A pressure compensating connecting rod assembly as defined in claim 3, said universal joints having outer ends having means connectible to a drive member and a driven member and inner ends connected with said body at its ends, said ends of said universal joints having passages therethrough for the flow of lubricant from said outer ends through said inner ends into said cylinder, said pistons and said body having passage means permitting the filling of said universal joints and said cylinder between said universal joints and said pistons with said lubricant, with said pistons spaced apart at opposite sides of said port.

12. A pressure compensating connecting rod assembly as defined in claim 11; said pistons having axially spaced heads and an intermediate reduced section forming with said cylinder an annular space, said passage means in said pistons including an axial passage extending into said reduced section, a radial port leading from said axial passage to said annular space, and including means plugging said radial port, and said passage means in said body including a radial passage leading from said annular space to the exterior of said body, and including means plugging said radial passage.

13. A pressure compensating connecting rod assembly as defined in claim 11; said pistons having axially spaced heads and an intermediate reduced section forming with said cylinder an annular space, said passage means in said pistons including an axial passage extending into said reduced section, a radial port leading from said axial passage to said annular space, and including means plugging said radial port, and said passage means in said body including a radial passage leading from said annular space to the exterior of said body, and including means plugging said radial passage, said body having axially spaced radial openings for receiving a removable stop and spaced from said radial passages to locate said annular space in registry with said radial passage in said body, and including means plugging said radial openings.

14. In hole apparatus comprising: a helicoidal fluid driven motor having a rotor and a stator, a tubular structure connected to said stator and receiving motor fluid from said stator, including a bearing housing having a rotary drive shaft; and a connecting rod assembly in said tubular structure between said rotor and said drive shaft for converting eccentric motion of said rotor to rotary motion of drive shaft; said connecting rod assembly including a tubular connecting rod body; universal joints at the ends of said body and connected with said rotor and said drive shaft; boot means enclosing said universal joints for containing a lubricant in said body and said universal joints; and equalizing means in pressure transfer relation with said boot means internally of said boot means and with the exterior of said body in said tubular structure for equalizing the pressure acting on said boot means.

15. In hole apparatus as defined in claim 14; said universal; joints and said equalizing means having passage means for permitting the filling of said universal joints and said equalizing means with a lubricant and purging air therefrom.

16. In hole apparatus comprising: a helicoidal fluid driven motor having a rotor and a stator, a tubular structure connected to said stator and receiving motor fluid from said stator, including a bearing housing having a rotary drive shaft; and a connecting rod assembly in said tubular structure between said rotor and said drive shaft for converting eccentric motion of said rotor to rotary motion of drive shaft; said connecting rod assembly including a tubular connecting rod body; universal joints at the ends of said body and connected with said rotor and said drive shaft; boot means enclosing said universal joints for containing a lubricant in said body and said universal joints; and equalizing means in pressure transfer relation with said boot means internally of said boot means and with the exterior of said body in said tubular structure for equalizing the pressure acting on said boot means; said equalizing means comprising an elongated cylinder in said body communicating with said universal joints, a pair of pistons reciprocable in said cylinder in sealing engagement therewith, and a port extending between the exterior of said body and said cylinder between said pistons.

17. In hole apparatus as defined in claim 16, said universal joints, said pistons and said body having passage means for permitting the filling of said universal joints and said cylinder between said universal joints and said pistons with a lubricant, with said pistons sapced apart at opposite sides of said port.

18. In hole apparatus as defined in claim 16, and including means permitting the filling of said universal joints with a lubricant, with said pistons spaced apart at opposite sides of said port.

* * * * *